United States Patent
Mo et al.

(10) Patent No.: US 12,339,950 B2
(45) Date of Patent: Jun. 24, 2025

(54) WEAK PASSWORD DETECTION METHOD AND DEVICE BASED ON DEEP LEARNING, AND ELECTRONIC DEVICE

(71) Applicant: DBAPPSECURITY CO., LTD, Hangzhou (CN)

(72) Inventors: Fan Mo, Hangzhou (CN); Chenyue Yu, Hangzhou (CN); Yuan Fan, Hangzhou (CN); Bo Liu, Hangzhou (CN)

(73) Assignee: DBAPPSECURITY CO., LTD, Hangzhou (CN)

( * ) Notice: Subject to any disclaimer, the term of this patent is extended or adjusted under 35 U.S.C. 154(b) by 225 days.

(21) Appl. No.: 18/022,751

(22) PCT Filed: Apr. 28, 2021

(86) PCT No.: PCT/CN2021/090394
§ 371 (c)(1),
(2) Date: Feb. 23, 2023

(87) PCT Pub. No.: WO2022/041815
PCT Pub. Date: Mar. 3, 2022

(65) Prior Publication Data
US 2023/0315835 A1    Oct. 5, 2023

(30) Foreign Application Priority Data
Aug. 25, 2020    (CN) .......................... 202010862802.9

(51) Int. Cl.
*G06F 21/46*    (2013.01)
(52) U.S. Cl.
CPC .................................. *G06F 21/46* (2013.01)

(58) Field of Classification Search
CPC .................................. G06F 21/46; G06F 21/44
(Continued)

(56) References Cited

U.S. PATENT DOCUMENTS

| 11,558,367 | B2* | 1/2023 | Wright .................... G06F 21/46 |
| 2006/0259766 | A1* | 11/2006 | Rasti ...................... G06F 21/31 713/168 |

(Continued)

FOREIGN PATENT DOCUMENTS

| CN | 110807476 A | 2/2020 |
| CN | 111353147 A | 6/2020 |

(Continued)

OTHER PUBLICATIONS

International Search Report of PCT/CN2021/090394.

*Primary Examiner* — Bharat Barot (57) ABSTRACT

A weak password detection method and device based on deep learning, an electronic device, and a storage medium are provided. The method includes: acquiring a password character string to be detected; processing, by applying a fully trained weak password detection model, the password character string to be detected to obtain a strong/weak password classification label of the password character string to be detected, the fully trained weak password detection model being obtained by training a deep learning model with a password character string as an input and a strong/weak password classification label corresponding to the password character string as a supervision; and marking the password character string to be detected as a weak password under the condition that the strong/weak password classification label is a weak password label.

13 Claims, 2 Drawing Sheets

(58) Field of Classification Search
USPC .......................................................... 726/5–7
See application file for complete search history.

(56) References Cited

U.S. PATENT DOCUMENTS

| | | | |
|---|---|---|---|
| 2007/0011738 A1* | 1/2007 | Doss ........................ | G06F 21/36 |
| | | | 726/18 |
| 2009/0055910 A1* | 2/2009 | Lee .......................... | G06F 21/46 |
| | | | 726/6 |
| 2020/0151323 A1* | 5/2020 | Kras ........................ | G06F 21/46 |
| 2021/0049259 A1* | 2/2021 | Cheng ..................... | G06F 21/45 |
| 2021/0350001 A1* | 11/2021 | Alturaifi ................. | G06F 21/57 |

FOREIGN PATENT DOCUMENTS

| | | |
|---|---|---|
| CN | 112149111 A | 12/2020 |
| WO | WO2018119315 A1 | 6/2018 |

* cited by examiner

WEAK PASSWORD DETECTION METHOD AND DEVICE BASED ON DEEP LEARNING, AND ELECTRONIC DEVICE

CROSS-REFERENCE TO RELATED APPLICATIONS

This application is a U.S. national phase application under 35 U.S.C. § 371 base upon international patent application No. PCT/CN2021/090394, filed on Apr. 28, 2021, titled "WEAK PASSWORD DETECTION METHOD AND DEVICE BASED ON DEEP LEARNING, AND ELECTRONIC DEVICE", which itself claims all benefits accruing from China Patent Application No. 202010862802.9, filed on Aug. 25, 2020, titled "WEAK PASSWORD DETECTION METHOD AND DEVICE BASED ON DEEP LEARNING, AND ELECTRONIC DEVICE" in the China National Intellectual Property Administration, both of which are hereby incorporated by reference.

TECHNICAL FIELD

The present disclosure relates to the field of a network security technology, and in particular, to a weak password detection method and device based on deep learning, and an electronic device.

BACKGROUND

A weak password is not strictly or precisely defined, and a password that can be easily guessed by others or cracked by cracking tools is usually considered a weak password. A weak password may be a password that contains only simple numbers and letters, such as "123", "abc", etc., and such passwords can be easily cracked by others, which can put the user at risk.

A weak password can be very harmful. For example, if a weak password is guessed or cracked after a bank card is stolen or left out, the victim could lose a lot of money. If a weak password of a social tool is guessed or cracked, it could lead to account loss of the user, and the account of the user could be used by criminals to steal money from friends and relatives of an original owner. If a weak password of a home camera is cracked, it could lead to a wide spread of personal and family privacy on the Internet. Thus, password security is extremely important, and the emergence of the above problems precipitates an imminent need for weak password detection. The weak password detection can identify the security of the account password, alert the user to the weak password, and remind the user to change the account password.

At present, weak password detection in the related art is usually matching the account password in a weak password database which is established, or extracting feature information of the account password such as a length and complexity by a machine learning model for training and learning. The former requires establishing a large weak password database, matching account password in the weak password database is slow, and it can lead to a false detection when the account password is a weak password actually but a corresponding weak password does not exist in the weak password database. The latter requires extracting feature information of a large number of account passwords, and can only detect account passwords, feature information of which can be distinguished by the machine learning model. Therefore, the above technical solutions have a drawback of low accuracy rate in the weak password detection.

For the issue of low accuracy rate of the weak password detection, no effective solution has been proposed.

SUMMARY

The present disclosure provides a weak password detection method and device based on deep learning, and an electronic device, which can solve a problem of low accuracy rate of the weak password detection in related art.

In a first aspect, the present disclosure provides a weak password detection method based on deep learning, including: acquiring a password character string to be detected; processing, by applying a fully trained weak password detection model, the password character string to be detected to obtain a strong/weak password classification label of the password character string to be detected; and marking the password character string to be detected as a weak password under a condition that the strong/weak password classification label of the password character string to be detected is a weak password label. The fully trained weak password detection model is obtained by training a deep learning model with a password character string as an input and a strong/weak password classification label corresponding to the password character string as a supervision In some embodiments, after acquiring the password character string to be detected, the method further includes: pre-processing the password character string to be detected, to obtain a password character string to be detected after pre-processing.

In some embodiments, the pre-processing the password character string to be detected, to obtain the password character string to be detected after pre-processing further includes: performing one-hot encoding for the password character string to be detected, and converting each character in the password character string to be detected into a code with a length denoted as N; combining the password character string to be detected into a matrix of M rows and N columns from top to bottom according to an order of each character in the password string to be detected; normalizing the matrix of M rows and N columns to obtain a matrix of X rows and N columns; performing an image scaling process on the matrix of X rows and N columns to obtain a matrix of X rows and N columns with a preset image size; and taking the matrix of X rows and N columns with the preset image size as the password character string to be detected after pre-processing. M is the number of characters in the password character string to be detected, and X is a preset number of rows.

In some embodiments, the normalizing the matrix of M rows and N columns to obtain the matrix of X rows and N columns further includes: adding an all-0 matrix of (X-M) rows and N columns below the matrix of M rows and N columns to obtain the matrix of X rows and N columns.

In some embodiments, before processing, by applying the fully trained weak password detection model, the password character string to be detected to obtain the strong/weak password classification label of the password character string to be detected, the method further includes: constructing an initial weak password detection model; acquiring a training sample set; and taking the password character strings in the training sample set as input information of the initial weak password detection model, updating the parameters of the initial weak password detection model with the strong password classification label and the weak password classification label corresponding to the password strings in the training sample set as supervision, and obtaining the fully trained weak password detection model. The training sample set includes either or both of a weak password sample set and a strong password sample set, the weak password sample set includes a plurality of password character strings marked with a weak password classification label, and the strong password sample set includes a plurality of password strings marked with a strong password classification label.

In some embodiments, after marking the password character string to be detected as the weak password under the condition that the strong/weak password classification label of the password character string to be detected is the weak password label, the method further includes: displaying the password character string to be detected and generating a reminder message.

In some embodiments, the acquiring the password character string to be detected includes: scanning a device to be performed a weak password detection, and extracting the password character string to be detected from the device to be performed the weak password detection.

In a second aspect, the present disclosure further provides a weak password detection device based on deep learning, including an acquiring module, a detecting module, and a marking module. The acquiring module is configured for acquiring a password character string to be detected. The detecting module is configured for processing, by applying a fully trained weak password detection model, the password character string to be detected to obtain a strong/weak password classification label of the password character string to be detected. The fully trained weak password detection model is obtained by training a deep learning model with a password character string as an input and a strong/weak password classification label corresponding to the password character string as a supervision. The marking module is configured for marking the password character string to be detected as a weak password under a condition that the strong/weak password classification label of the password character string to be detected is a weak password label.

In a third aspect, the present disclosure further provides an electronic device, including a processor and a memory that stores a computer program running on the processor. The computer program is executed by the processor to implement the steps of the weak password detection method based on deep learning in the first aspect.

In a fourth aspect, the present disclosure further provides a storage medium having stored a computer program. The computer program is executed by a processor to implement the steps of the weak password detection method based on deep learning in the first aspect.

In contrast to the related art, the present disclosure provides the weak password detection method and device based on deep learning, an electronic device, and a storage medium, which may solve the problem of low accuracy rate of the weak password detection in related art, and achieve technical effect of improving accuracy rate of the weak password detection.

The details of one or more embodiments of the present disclosure are set forth in the accompanying drawings and the description below. Other features, objects and advantages of the present disclosure will become apparent from the description and drawings.

BRIEF DESCRIPTION OF THE DRAWINGS

The drawings illustrated herein are used to provide a further understanding of the present disclosure, constituting part of the present disclosure. Illustrative embodiments of the present disclosure and its description used for explain the present disclosure, are not construed as an undue qualification of the present disclosure. In the drawings.

DETAILED DESCRIPTION

In order to make objects, technical solutions and advantages of the present disclosure more clearly understood, the present disclosure is described and illustrated in the following with reference to the accompanying drawings and embodiments. It should be understood that specific embodiments described herein are only used to explain the present disclosure and not intended to limit the present disclosure. All other embodiments obtained by those skilled in the art based on the embodiments of the present disclosure without making creative labor are within the scope of the present disclosure. It is also understood that although the efforts made in such development process may be complex and lengthy, some changes in design, manufacture or production based on the technical content disclosed in the present disclosure are only conventional technical means to those skilled in the art related to the content disclosed in the present disclosure and should not be construed as inadequate for the content disclosed in the present disclosure.

The reference to "embodiment" in the present disclosure means that with reference to the particular features, structures or characteristics described in the embodiments may be included in at least one embodiment of the present disclosure. The phrase "embodiment" appears in various positions in the description does not necessarily refer to the same embodiment, nor is it a separate or embodiment that is mutually exclusive with other embodiments. It can be expressly and implicitly understood by those skilled in the art that the embodiments described in the present disclosure may be combined with other embodiments in the absence of conflict.

Unless otherwise defined, all technical and scientific terms used herein have the same meaning as a skilled person in the art would understand. The term "one", "a", "an", "the" and other similar words as used in the present disclosure do not indicate quantitative limitations, and they can be singular or plural. The terms "include", "comprise", "have", and any variation thereof, as used in the present disclosure, are intended to cover a non-exclusive inclusion. For example, processes, methods, systems, products, or devices including a series of steps or modules (units) are not limited to listed steps or units, but may include steps or units not listed, or may include other steps or units inherent in those processes, methods, products, or devices. The terms "connection", "connected", "coupling", and other similar words as used in the present disclosure are not limited to physical or mechanical connections, but may include electrical connections, which can be direct connections or indirect connections. The term "plurality" in the present disclosure refers to two or more. "And/or" describes an association relationship between associated objects, indicating that there can be three kinds of relationships. For example, "A and/or B" can mean that A exists alone, A and B exist at the same time, and B exists alone. The character "/" indicates that the objects associated with each other are in an "or" relationship. The terms "first", "second", "third", etc. involved in the present disclosure are only configured for distinguishing similar objects, and do not represent a specific order of the objects.

Figure 1:
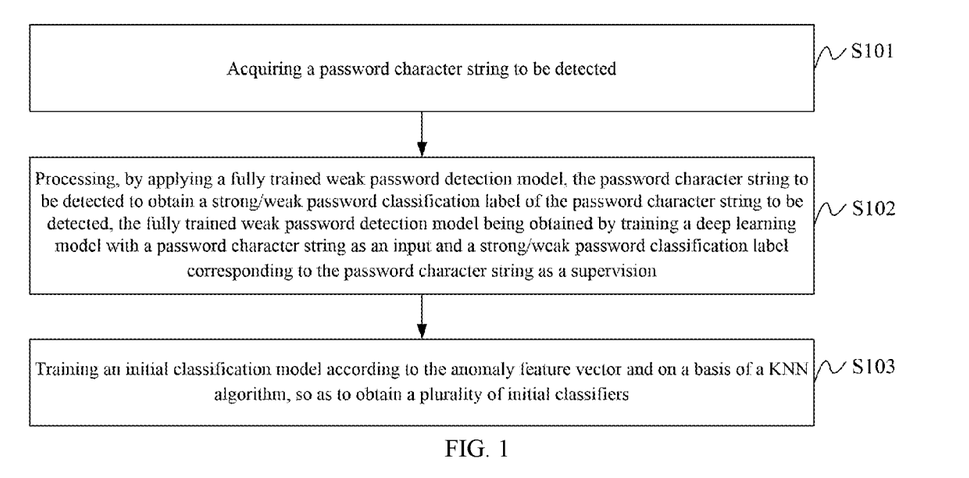
FIG. 1 is a flowchart of a weak password detection method based on deep learning in an embodiment of the present disclosure.

The present disclosure provides a weak password detection method based on deep learning. FIG. 1 is a flowchart of the weak password detection method based on deep learning in an embodiment of the present disclosure. Referring to FIG. 1, the flowchart may include step 101 to step 103.

Step 101 includes acquiring a password character string to be detected.

At present, many devices may be equipped with an initial login password, the user often use a default password set by the device in a mindset of saving time or fear of changing the password to forget the password, such as admin, 111111, which will enable the password of these devices easy to guess or to be cracked, resulting in losses to the user.

In an embodiment, step 101 may be performed by scanning the devices to be performed a weak password detection and extracting the password character string to be detected from the devices to be performed the weak password detection. A first mark may be set for the devices that have been performed the weak password detection. Devices that do not have the first mark may be obtained, and it is determined that these devices that do not have the first mark are the devices to be performed the weak password detection. The password character string to be detected may be extracted from the devices to be performed the weak password detection, solving a problem of loss to the user due to weak passwords of the devices being cracked.

The devices to be performed the weak password detection may include, but not limited to, at least one of the following: a home camera, a personal computer, and a network router.

In an embodiment, after acquiring the password character string to be detected, the method may further include: pre-processing the password character string to be detected, to obtain a password character string to be detected after pre-processing.

In an present embodiment, the pre-processing the password character string to be detected, to obtain a password character string to be detected after pre-processing may further include: performing one-hot encoding for the password character string to be detected, and converting each character in the password character string to be detected into a code with a length denoted as N; combining the password character string to be detected into a matrix of M rows and N columns from top to bottom according to an order of each character in the password string to be detected; normalizing the matrix of M rows and N columns to obtain a matrix of X rows and N columns; performing an image scaling process on the matrix of X rows and N columns to obtain a matrix of X rows and N columns with a preset image size; and taking the matrix of X rows and N columns with the preset image size as the password character string to be detected after pre-processing. M may be the number of characters in the password character string to be detected, and X may be a preset number of rows.

In an embodiment, a decimal digit corresponding to each character in the password character string to be detected may be obtained in an ASCLL code table. Each character in the password character string to be detected may be converted into the code with the length denoted as N by one-hot encoding of the decimal corresponding to each character in the password character string to be detected, e.g., N may be 128.

A weak password "woaini1314" may be taken as an example, "woaini1314" may include 10 characters, so M may be 10 and N may be 128 in this embodiment.

The weak password "woaini1314" may be performed one-hot encoding, and the following may be obtained.

The decimal digit corresponding to w may be 119, $$\left[ \underbrace{000 \ldots 000}_{0\sim118} \ \underbrace{1}_{119} \ \underbrace{000 \ldots 000}_{120\sim127} \right]$$

may be obtained after encoding.

The decimal digit corresponding to o may be 111, $$\left[ \underbrace{000 \ldots 000}_{0\sim110} \ \underbrace{1}_{111} \ \underbrace{000 \ldots 000}_{112\sim127} \right]$$

may be obtained after encoding.

The decimal digit corresponding to a may be 97, $$\left[ \underbrace{000 \ldots 000}_{0\sim96} \ \underbrace{1}_{97} \ \underbrace{000 \ldots 000}_{98\sim127} \right]$$

may be obtained after encoding.

The decimal digit corresponding to i may be 105, $$\left[ \underbrace{000 \ldots 000}_{0\sim104} \ \underbrace{1}_{105} \ \underbrace{000 \ldots 000}_{106\sim127} \right]$$

may be obtained after encoding.

The decimal digit corresponding to n may be 110, $$\left[ \underbrace{000 \ldots 000}_{0\sim109} \ \underbrace{1}_{110} \ \underbrace{000 \ldots 000}_{111\sim127} \right]$$

may be obtained after encoding.

The decimal digit corresponding to i may be 105, $$\left[ \underbrace{000 \ldots 000}_{0\sim104} \ \underbrace{1}_{105} \ \underbrace{000 \ldots 000}_{106\sim127} \right]$$

may be obtained after encoding.

The decimal digit corresponding to 1 may be 49, $$\left[ \underbrace{000 \ldots 000}_{0\sim48} \ \underbrace{1}_{49} \ \underbrace{000 \ldots 000}_{50\sim127} \right]$$

may be obtained after encoding.

The decimal digit corresponding to 3 may be 51, $$\left[ \underbrace{000 \ldots 000}_{0\sim50} \ \underbrace{1}_{51} \ \underbrace{000 \ldots 000}_{52\sim127} \right]$$

may be obtained after encoding.

The decimal digit corresponding to 1 may be 49, $$\begin{bmatrix} \underbrace{000 \ldots 000}_{0\sim 48} & \underbrace{1}_{49} & \underbrace{000 \ldots 000}_{50\sim 127} \end{bmatrix}$$

may be obtained after encoding.

The decimal digit corresponding to 4 may be 52, $$\begin{bmatrix} \underbrace{000 \ldots 000}_{0\sim 51} & \underbrace{1}_{52} & \underbrace{000 \ldots 000}_{53\sim 127} \end{bmatrix}$$

may be obtained after encoding.

The above codes may be combined into a matrix of 10 rows and 128 columns from top to bottom according to the order of each character in the password string to be detected.

In an embodiment, the normalizing the matrix of M rows and N columns to obtain the matrix of X rows and N columns may further include: adding an all-0 matrix of (X-M) rows and N columns below the matrix of M rows and N columns to obtain the matrix of X rows and N columns.

For example, the above weak password "woaini1314" may be combined into the matrix of 10 rows and 128 columns, a matrix of 227 rows and 128 columns may be obtained by adding an all-0 matrix of 217 rows and 128 columns below the matrix of 10 rows and 128 columns.

In an embodiment, after obtaining the matrix of X rows and N columns, the image scaling process may be performed on the matrix of X rows and N columns to obtain the matrix of X rows and N columns with a preset image size, so as to ensure that all the password character strings to be detected are expanded into a matrix of the same size, which facilitates inputting to the subsequent fully-trained weak password detection model. The preset image size may be 227*227. In other embodiments, the preset image size may be other values.

Step 102 includes processing, by applying a fully trained weak password detection model, the password character string to be detected to obtain a strong/weak password classification label of the password character string to be detected. The fully trained weak password detection model is obtained by training a deep learning model with a password character string as an input and a strong/weak password classification label corresponding to the password character string as a supervision.

In an embodiment, the fully trained weak password detection model at step 102 may be trained by the following steps.

Step 1 may include constructing an initial weak password detection model.

Step 2 may include acquiring a training sample set. The training sample set may include either or both of a weak password sample set and a strong password sample set, the weak password sample set may include a plurality of password character strings marked with a weak password classification label, and the strong password sample set may include a plurality of password strings marked with a strong password classification label.

Step 3 may include taking the password character strings in the training sample set as input information of the initial weak password detection model, updating the parameters of the initial weak password detection model with the strong password classification label and the weak password classification label corresponding to the password strings in the training sample set as supervision, and obtaining the fully trained weak password detection model.

In an embodiment, a weak password sample set and a strong password sample set may be collected in an open-source website. Each password character string in the weak password sample set and the strong password sample set may correspond to a strong/weak password classification label, which may be 1 (represents a weak password) or 0 (represents a strong password), respectively. For example, the strong/weak password classification labels corresponding to "123456", "root", and "woaini1314" may be 1, and the strong/weak password classification labels corresponding to "wC3TjVTtdxINBvR5", "v0B$OΓX", and "g0k5zUNmwkJEwfXENov2" may be 0.

In an embodiment, a convolutional neural network may be constructed by AlexNet as the weak password detection model. In some embodiments, the AlexNet may be pre-trained based on an ImageNet dataset.

A typical layer structure of the AlexNet network applied in the weak password detection model in an embodiment may be:

1. Input: an input image with a size of 227*227*3;
2. Conv-1: a first convolutional layer with a kernel size of 11*11, a kernel number of 96, a stride of 4, an edge padding of 0;
3. MaxPool-1: a first pooling layer that pooling of Conv-1 with a size of 3*3 and a stride of 2;
4. Conv-2: a second convolutional layer with a kernel size of 5*5, a kernel number of 256, a stride of 4, and an edge padding of 2;
5. MaxPool-2: a second pooling layer with a size of 3*3 and a stride of 2;
6. Conv-3: a third convolutional layer with a kernel size of 3*3, a kernel number of 384, a stride of 1, and an edge padding of 1;
7. Conv-4: a structure of a fourth convolutional layer is the same as that of the third convolutional layer;
8. Conv-3: a fifth convolutional layer with a kernel size of 3*3, a kernel number of 256, a stride of 1, and an edge padding of 1;
9. MaxPool-3: a third pooling layer with a size of 3*3 and a stride of 2;
10. FC-1: a first fully connected layer with 4096 neurons;
11. FC-2: a second fully connected layer with 4096 neurons;
12. FC-3: a third fully connected layer with 1000 neurons.

In an embodiment, a plurality of password character strings in the weak password sample set and the strong password sample set may be normalized to a uniform size, e.g., an image size of 227*227, which facilitates inputting to the subsequent weak password detection model.

Step 103 includes marking the password character string to be detected as a weak password under a condition that the strong/weak password classification label of the password character string to be detected is a weak password label.

In an embodiment, after marking the password character string to be detected as the weak password under the condition that the strong/weak password classification label of the password character string to be detected is the weak password label, the method may further include: displaying the password character string to be detected and generating a reminder message.

In the present embodiment, under a condition that the password character string to be detected is a weak password, the password character string to be detected may be displayed, and the reminder message may be generated to remind the user to modify the password character string to be detected. It is ensured that the weak password is modified by the user within first time when the weak password is detected, improving security of the devices of the user.

A weak password detection in the related art is usually matching the account password in a weak password database which is established, or extracting feature information of the account password such as a length and complexity by a machine learning model for training and learning. The former requires establishing a large weak password database, matching account password in the weak password database is slow, and it can lead to a false detection when the account password is a weak password actually but a corresponding weak password does not exist in the weak password database. The latter requires extracting feature information of a large number of account passwords, and can only detect account passwords, feature information of which can be distinguished by the machine learning model. Therefore, the above technical solutions have a drawback of low accuracy rate in the weak password detection.

At the above step 101 to step 103, the weak password may be detected based on the deep learning model, and the password character string to be detected may be pre-processed and normalized into the matrix of X rows and N columns, which may facilitate inputting to the fully trained weak password detection model. The strong/weak password classification label of the password character string to be detected may be output from the fully trained weak password detection model, and it may be marked that whether the password character string to be detected is the weak password according to the strong/weak password classification label. In a case that the password character string to be detected is the weak password, the password character string to be detected may be displayed and the reminder message may be generated. Detection accuracy of the weak password is high, and a detection result is highly robust. The method may solve a problem of low accuracy rate of the weak password detection in related art, and achieve technical effect of improving accuracy rate of the weak password detection.

The present disclosure further provides a weak password detection device based on deep learning, which is configured to realize the above embodiments and alternative embodiments, which have been described without further elaboration. Although the device described in the following embodiments may be preferably implemented in software, implementations of hardware, or combinations of software and hardware, are also possible and contemplated.

Figure 2:
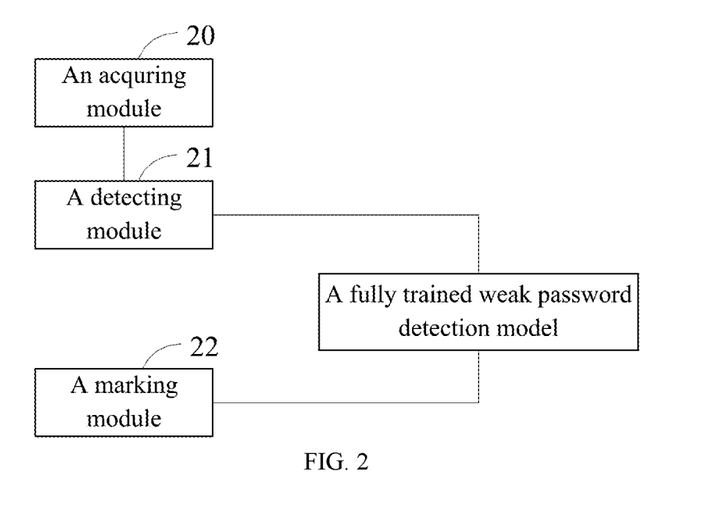
FIG. 2 is a block diagram of a weak password detection device based on deep learning in an embodiment of the present disclosure.

FIG. 2 is a block diagram of a weak password detection device based on deep learning in an embodiment of the present disclosure. Referring to FIG. 2, the device includes an acquiring module 20, a detecting module 21, and a marking module 22. The acquiring module 20 is configured for acquiring a password character string to be detected. The detecting module 21 is configured for processing, by applying a fully trained weak password detection model, the password character string to be detected to obtain a strong/weak password classification label of the password character string to be detected. The fully trained weak password detection model is obtained by training a deep learning model with a password character string as an input and a strong/weak password classification label corresponding to the password character string as a supervision. The marking module 22 is configured for marking the password character string to be detected as a weak password under a condition that the strong/weak password classification label of the password character string to be detected is a weak password label.

In an embodiment, the device may further include a pre-processing module, which is configured for pre-processing the password character string to be detected, to obtain a password character string to be detected after pre-processing.

In an embodiment, the pre-processing module is further configured for performing one-hot encoding for the password character string to be detected, and converting each character in the password character string to be detected into a code with a length denoted as N; combining the password character string to be detected into a matrix of M rows and N columns from top to bottom according to an order of each character in the password string to be detected; normalizing the matrix of M rows and N columns to obtain a matrix of X rows and N columns; performing an image scaling process on the matrix of X rows and N columns to obtain a matrix of X rows and N columns with a preset image size; and taking the matrix of X rows and N columns with the preset image size as the password character string to be detected after pre-processing. M is the number of characters in the password character string to be detected, and X is a preset number of rows.

In an embodiment, the pre-processing module is further configured for adding an all-0 matrix of (X-M) rows and N columns below the matrix of M rows and N columns to obtain the matrix of X rows and N columns. X is the preset number of rows.

In an embodiment, the fully trained weak password detection model in the weak password detection device based on deep learning may be trained by the following steps: constructing an initial weak password detection model; acquiring a training sample set; and taking the password character strings in the training sample set as input information of the initial weak password detection model, updating the parameters of the initial weak password detection model with the strong password classification label and the weak password classification label corresponding to the password strings in the training sample set as supervision, and obtaining the fully trained weak password detection model. The training sample set may include either or both of a weak password sample set and a strong password sample set, the weak password sample set may include a plurality of password character strings marked with a weak password classification label, and the strong password sample set may include a plurality of password strings marked with a strong password classification label.

In an embodiment, the device may further include a display module, which is configured for displaying the password character string to be detected and generating a reminder message.

In an embodiment, the acquiring module 20 is further configured for scanning a device to be performed a weak password detection, and extracting the password character string to be detected from the device to be performed the weak password detection.

It should be noted that the above modules may be a functional module or a program module, and may be implemented either by software or by hardware. For modules implemented by hardware, the above modules may be located in the same processor, or the above modules may be located in different processors in any combination.

Figure 3:
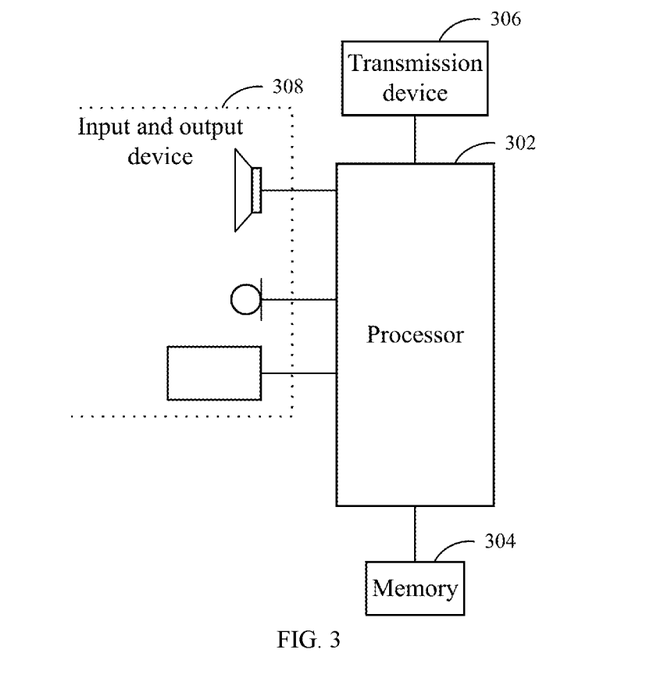
FIG. 3 is a block diagram of a hardware structure of an electronic device.

The present disclosure further provides an electronic device, including a processor 302 and a memory 304 that stores a computer program running on the processor 302, and the computer program may be executed by the processor 302 to implement the steps of any of the above weak password detection methods.

Specifically, the above processor 302 may include a central processing unit (CPU), or an Application Specific Integrated Circuit (ASIC). The processor 302 may be configured to implement one or more integrated circuits of embodiments in the present disclosure.

The memory 304 may include a mass storage for data or instructions. For example, and not as a limitation, the memory 304 may include a Hard Disk Drive (HDD), a floppy disk drive, a Solid State Drive (SSD), a flash memory, an optical disk, a magnetic disk, a magnetic tape, a Universal Serial Bus (USB) drive, or a combination of two or more of the above. In an appropriate situation, the memory 304 may include removable or non-removable (or fixed) media. In an appropriate situation, the memory 304 may be internal or external to a data processing device. In particular embodiments, the memory 304 may be a Non-Volatile memory. In particular embodiments, the memory 32 may include a Read-Only Memory (ROM) and a Random Access Memory (RAM). In an appropriate situation, the ROM may be a mask-programmed ROM, a Programmable Read-Only Memory (PROM), an Erasable Programmable Read-Only Memory (EPROM), an Electrically Erasable Programmable Read-Only Memory (EEPROM), an Electrically Alterable Read-Only Memory (EAROM), a Flash Memory (FLASH), or a combination of two or more of the above. In an appropriate situation, the RAM may be a Static Random-Access Memory (SRAM) or a Dynamic Random Access Memory (DRAM). The DRAM may be a Fast Page Mode Dynamic Random Access Memory (FPMDRAM). The DRAM can be a Fast Page Mode Dynamic Random Access Memory (FPMDRAM), an Extended Data Out Dynamic Random Access Memory (EDODRAM), a Synchronous Dynamic Random-Access Memory (SDRAM), etc.

The memory 304 may be configured to store or cache various data files to be processed and/or be used for communication, as well as possible computer program instructions to be executed by the processor 302.

The processor 302 may implement any of the weak password detection methods in the above embodiments by reading and executing the computer program instructions stored in the memory 304.

Alternatively, the above electronic device may further include a transmission device 306 and an input and output device 308. The transmission device 306 may be connected to the processor 302, and the input and output device 308 may be connected to the processor 302.

Alternatively, in the present embodiment, the processor 302 is configured to perform the following S1 to S3 via the computer program.

S1 includes acquiring a plurality of segments of traffic data in different monitoring states.

S2 includes processing, by applying a fully trained weak password detection model, the password character string to be detected to obtain a strong/weak password classification label of the password character string to be detected. The fully trained weak password detection model is obtained by training a deep learning model with a password character string as an input and a strong/weak password classification label corresponding to the password character string as a supervision.

S3 includes marking the password character string to be detected as a weak password under a condition that the strong/weak password classification label of the password character string to be detected is a weak password label.

It should be noted that specific examples in the embodiment may be referred to the examples described in the above embodiments and alternative embodiments, which will not be repeated herein.

In addition, in conjunction with the weak password detection methods based on deep learning in the above embodiments, the present disclosure may provide a storage medium to implement the weak password detection methods based on deep learning. The storage medium has stored a computer program, and the computer program is executed by a processor to implement any of the weak password detection methods based on deep learning in the above embodiments.

It should be understood by those skilled in the art that the technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A weak password detection method based on deep learning, comprising:
   acquiring a password character string to be detected;
   processing, by applying a fully trained weak password detection model, the password character string to be detected to obtain a strong/weak password classification label of the password character string to be detected, wherein the fully trained weak password detection model is obtained by training a deep learning model with a password character string as an input and a strong/weak password classification label corresponding to the password character string as a supervision; and
   marking the password character string to be detected as a weak password under a condition that the strong/weak password classification label of the password character string to be detected is a weak password label;
   after acquiring the password character string to be detected, the method further comprises:
   pre-processing the password character string to be detected, to obtain a password character string to be detected after pre-processing;
   the pre-processing the password character string to be detected, to obtain the password character string to be detected after pre-processing further comprises:
   performing one-hot encoding for the password character string to be detected, and converting each character in the password character string to be detected into a code with a length denoted as N;
   combining the password character string to be detected into a matrix of M rows and N columns from top to bottom according to an order of each character in the password string to be detected, wherein M is the number of characters in the password character string to be detected;

normalizing the matrix of M rows and N columns to obtain a matrix of X rows and N columns, wherein X is a preset number of rows;

performing an image scaling process on the matrix of X rows and N columns to obtain a matrix of X rows and N columns with a preset image size; and taking the matrix of X rows and N columns with the preset image size as the password character string to be detected after pre-processing.

2. The weak password detection method based on deep learning of claim 1, wherein the normalizing the matrix of M rows and N columns to obtain the matrix of X rows and N columns further comprises:

adding an all-0 matrix of (X-M) rows and N columns below the matrix of M rows and N columns to obtain the matrix of X rows and N columns.

3. The weak password detection method based on deep learning of claim 1, wherein before processing, by applying the fully trained weak password detection model, the password character string to be detected to obtain the strong/weak password classification label of the password character string to be detected, the method further comprises:

constructing an initial weak password detection model;

acquiring a training sample set, wherein the training sample set comprises either or both of a weak password sample set and a strong password sample set, the weak password sample set comprises a plurality of password character strings marked with a weak password classification label, and the strong password sample set comprises a plurality of password strings marked with a strong password classification label; and taking the password character strings in the training sample set as input information of the initial weak password detection model, updating the parameters of the initial weak password detection model with the strong password classification label and the weak password classification label corresponding to the password strings in the training sample set as supervision, and obtaining the fully trained weak password detection model.

4. The weak password detection method based on deep learning of claim 1, wherein after marking the password character string to be detected as the weak password under the condition that the strong/weak password classification label of the password character string to be detected is the weak password label, the method further comprises:

displaying the password character string to be detected and generating a reminder message.

5. The weak password detection method based on deep learning of claim 1, wherein the acquiring the password character string to be detected comprises:

scanning a device to be performed a weak password detection, and extracting the password character string to be detected from the device to be performed the weak password detection.

6. An electronic device, comprising a processor and a memory that stores a computer program running on the processor, wherein the computer program is executed by the processor to implement the steps of a weak password detection method based on deep learning, comprising:

acquiring a password character string to be detected;

processing, by applying a fully trained weak password detection model, the password character string to be detected to obtain a strong/weak password classification label of the password character string to be detected, wherein the fully trained weak password detection model is obtained by training a deep learning model with a password character string as an input and a strong/weak password classification label corresponding to the password character string as a supervision; and marking the password character string to be detected as a weak password under a condition that the strong/weak password classification label of the password character string to be detected is a weak password label;

after acquiring the password character string to be detected, the method further comprises:

pre-processing the password character string to be detected, to obtain a password character string to be detected after pre-processing;

the pre-processing the password character string to be detected, to obtain the password character string to be detected after pre-processing further comprises:

performing one-hot encoding for the password character string to be detected, and converting each character in the password character string to be detected into a code with a length denoted as N;

combining the password character string to be detected into a matrix of M rows and N columns from top to bottom according to an order of each character in the password string to be detected, wherein M is the number of characters in the password character string to be detected;

normalizing the matrix of M rows and N columns to obtain a matrix of X rows and N columns, wherein X is a preset number of rows;

performing an image scaling process on the matrix of X rows and N columns to obtain a matrix of X rows and N columns with a preset image size; and taking the matrix of X rows and N columns with the preset image size as the password character string to be detected after pre-processing.

7. The electronic device of claim 6, wherein the normalizing the matrix of M rows and N columns to obtain the matrix of X rows and N columns further comprises:

adding an all-0 matrix of (X-M) rows and N columns below the matrix of M rows and N columns to obtain the matrix of X rows and N columns.

8. The electronic device of claim 6, wherein before processing, by applying the fully trained weak password detection model, the password character string to be detected to obtain the strong/weak password classification label of the password character string to be detected, the method further comprises:

constructing an initial weak password detection model;

acquiring a training sample set, wherein the training sample set comprises either or both of a weak password sample set and a strong password sample set, the weak password sample set comprises a plurality of password character strings marked with a weak password classification label, and the strong password sample set comprises a plurality of password strings marked with a strong password classification label; and taking the password character strings in the training sample set as input information of the initial weak password detection model, updating the parameters of the initial weak password detection model with the strong password classification label and the weak password classification label corresponding to the password strings in the training sample set as supervision, and obtaining the fully trained weak password detection model.

9. The electronic device of claim 6, wherein after marking the password character string to be detected as the weak password under the condition that the strong/weak password classification label of the password character string to be detected is the weak password label, the method further comprises:

displaying the password character string to be detected and generating a reminder message.

10. The electronic device of claim 6, wherein the acquiring the password character string to be detected comprises:

scanning a device to be performed a weak password detection, and extracting the password character string to be detected from the device to be performed the weak password detection.

11. A non-transitory storage medium having stored a computer program, wherein the computer program is executed by a processor to implement the steps of a weak password detection method based on deep learning, comprising:

acquiring a password character string to be detected;

processing, by applying a fully trained weak password detection model, the password character string to be detected to obtain a strong/weak password classification label of the password character string to be detected, wherein the fully trained weak password detection model is obtained by training a deep learning model with a password character string as an input and a strong/weak password classification label corresponding to the password character string as a supervision; and marking the password character string to be detected as a weak password under a condition that the strong/weak password classification label of the password character string to be detected is a weak password label;

after acquiring the password character string to be detected, the method further comprises:

pre-processing the password character string to be detected, to obtain a password character string to be detected after pre-processing;

the pre-processing the password character string to be detected, to obtain the password character string to be detected after pre-processing further comprises:

performing one-hot encoding for the password character string to be detected, and converting each character in the password character string to be detected into a code with a length denoted as N;

combining the password character string to be detected into a matrix of M rows and N columns from top to bottom according to an order of each character in the password string to be detected, wherein M is the number of characters in the password character string to be detected;

normalizing the matrix of M rows and N columns to obtain a matrix of X rows and N columns, wherein X is a preset number of rows;

performing an image scaling process on the matrix of X rows and N columns to obtain a matrix of X rows and N columns with a preset image size; and taking the matrix of X rows and N columns with the preset image size as the password character string to be detected after pre-processing.

12. The non-transitory storage medium of claim 11, wherein the normalizing the matrix of M rows and N columns to obtain the matrix of X rows and N columns further comprises:

adding an all-0 matrix of (X-M) rows and N columns below the matrix of M rows and N columns to obtain the matrix of X rows and N columns.

13. The non-transitory storage medium of claim 11, wherein before processing, by applying the fully trained weak password detection model, the password character string to be detected to obtain the strong/weak password classification label of the password character string to be detected, the method further comprises:

constructing an initial weak password detection model;

acquiring a training sample set, wherein the training sample set comprises either or both of a weak password sample set and a strong password sample set, the weak password sample set comprises a plurality of password character strings marked with a weak password classification label, and the strong password sample set comprises a plurality of password strings marked with a strong password classification label; and taking the password character strings in the training sample set as input information of the initial weak password detection model, updating the parameters of the initial weak password detection model with the strong password classification label and the weak password classification label corresponding to the password strings in the training sample set as supervision, and obtaining the fully trained weak password detection model.

* * * * *